UNITED STATES PATENT OFFICE.

ARTHUR GEORGE GREEN, OF STOCKPORT, AND ALEXANDER MEYENBERG, OF MANCHESTER, ENGLAND.

PROCESS OF MAKING FAST BROWN DYES.

SPECIFICATION forming part of Letters Patent No. 641,953, dated January 23, 1900.

Application filed October 7, 1899. Serial No. 732,878. (No specimens.)

*To all whom it may concern:*

Be it known that we, ARTHUR GEORGE GREEN, F. I. C., F. C. S., a subject of the Queen of Great Britain and Ireland, and a resident of 13 Kings Drive, Heaton Moor, Stockport, and ALEXANDER MEYENBERG, Ph. D., a subject of the Emperor of Germany, and a resident of 13 Nelson street, Ardwick, Manchester, in the county of Lancaster, England, have invented a new and useful Process of Making Fast Brown Coloring-Matter, (for which patents have been applied for in Great Britain, dated March 7, 1899, and September 15, 1899; in France, dated May 3, 1899, and in Germany, dated May 24, 1899, and September 18, 1899,) of which the following is a specification.

This invention (for which Letters Patent have been applied for in England, dated March 7, 1899, and September 15, 1899; in France, dated May 3, 1899, and in Germany, dated May 24, 1899, and September 18, 1899) relates to a process for the production of a new brown coloring-matter containing sulfur and capable of dyeing unmordanted cotton from an alkaline sulfide bath in fast brown shades which withstand the action of acids, alkalies, soap, air, and light to a remarkable degree. The coloring-matter is produced by the oxidation of a polyamin of the benzene series, which contains at least two amido groups in ortho or para position to each other in the presence of thiosulfuric acid, under the influence of which thiosulfuric acid sulfur is introduced into the new compound. The quantity of thiosulfuric acid used may be varied within considerable limits, the quantity of oxidizing agent being varied accordingly. In general from one-half to one molecular proportion of thiosulfuric acid is taken for each molecular proportion of polyamin, the higher proportion of thiosulfuric acid giving somewhat darker shades of brown than is given by the lower proportion. The product is a dark powder insoluble in water and dilute acids, sparingly soluble in carbonated alkalies, but dissolving readily in alkaline sulfids, forming a brown solution. It dissolves in concentrated sulfuric acid, forming a dark solution. By reducing agents, such as zinc powder and caustic soda, it is converted into a leuco compound which on exposure to air rapidly reoxidizes. From a bath containing sodium sulfide it dyes cotton a fast brown, the fastness of which is still further increased by subsequent passage through a bath containing a bichromate or a salt of copper.

Example I: A solution of thirty-one and three-fourths pounds of the monohydrochlorid of paratolylenediamin

$$C_6H_3(CH_3)(NH_2)_2(1:2:5)$$

in fifty gallons of water is mixed with forty-five pounds of crystallized sodium thiosulfate, (hyposulfite of soda,) $Na_2S_2O_3 + 5H_2O$, and when all is dissolved there is run into the solution a solution of thirty-seven and one-half pounds of bichromate of soda and eighteen and one-fourth pounds of concentrated sulfuric acid in eight gallons of water, the mixture being cooled to about from 20° to 25° centigrade. Thirty pounds of concentrated sulfuric acid diluted with four gallons of water are then added, and after standing for two or three hours a further thirteen pounds of sodium bichromate are added, followed by the addition of thirty-eight pounds more concentrated sulfuric acid. The mixture is then boiled until the dyestuff completely separates, and the said dyestuff is filtered off, washed with water, and dried.

Example II: A solution of one hundred and eight pounds of orthophenylenediamin in ten and one-fourth gallons of hydrochloric acid (3.85 pounds HCl per gallon) and one hundred gallons of water are mixed with a solution of one hundred and eighty-seven pounds of sodium thiosulfate, $Na_2S_2O_3 + 5H_2O$, in thirty gallons of water and oxidized by running in one hundred and seventy-five gallons of sodium-bichromate solution, (containing one pound of sodium bichromate and one-half pound concentrated sulfuric acid per gallon.) During the oxidation the temperature is kept at 10° to 20° centigrade by the addition of ice. Afterward one hundred and forty-six pounds of concentrated sulfuric acid diluted with one hundred gallons of water are added to the solution, and after standing for, say, from one to two hours the whole is treated further with fifty gallons more of the aforesaid bichromate solution. Finally three hundred and eighty pounds additional of concentrated sulfuric acid are added and the mixture is boiled until the dyestuff separates, and the said dyestuff is filtered off, washed with water, and dried.

The product of the process herein described forms the subject of a separate application for a patent filed by us October 7, 1899, bearing Serial No. 732,877.

Having now particularly described and ascertained the nature of this invention and in what manner the same is to be performed, we declare that what we claim is—

The new process for the production or manufacture of fast brown coloring-matter containing sulfur consisting in oxidizing a polyamin of the benzene series (containing at least two amido groups in para or ortho position to each other) in the presence of thiosulfuric acid in aqueous solution, under conditions substantially as hereinbefore described.

In testimony whereof we have signed our names to this specification in the presence of two subscribing witnesses.

ARTHUR GEORGE GREEN.
ALEXANDER MEYENBERG.

Witnesses:
ARTHUR VERNON BATHO,
ERNALD SIMPSON MOSELEY.